United States Patent [19]

Sugiura

[11] Patent Number: 4,890,985
[45] Date of Patent: Jan. 2, 1990

[54] AIR CONDITIONING SYSTEM WITH VARIABLE CAPACITY COMPRESSOR

[75] Inventor: Hiroyuki Sugiura, Konan, Japan
[73] Assignee: Diesel Kiki Co., Ltd., Tokyo, Japan
[21] Appl. No.: 236,001
[22] Filed: Aug. 24, 1988
[30] Foreign Application Priority Data Nov. 25, 1987 [JP] Japan .................... 62-298609

[51] Int. Cl.$^4$ ............... F04B 49/00; F04C 29/08
[52] U.S. Cl. .................... 417/295; 417/310
[58] Field of Search ........... 417/279, 302, 303, 304, 417/295, 310

[56] References Cited
U.S. PATENT DOCUMENTS 2,383,250 8/1945 Hewitt .................... 417/279
3,957,395 5/1976 Ensign .................... 417/279
4,715,792 12/1987 Nishizawa ............... 417/295

FOREIGN PATENT DOCUMENTS 58-158382 9/1983 Japan .
212689 10/1985 Japan .................... 417/310
62-129593 6/1987 Japan .

Primary Examiner—William L. Freeh
Attorney, Agent, or Firm—Frishauf, Holtz, Goodman & Woodward

[57] ABSTRACT

An air conditioning system includes a refrigerating circuit, and a variable capacity compressor forming part of the refrigerating circuit and having a high pressure zone and a device for varying the delivery quantity thereof in response to pressure in the high pressure zone. A high pressure communication passage communicates the high pressure zone with the refrigerating circuit. A pressure control valve is associated with the high pressure zone and the high pressure communication passage, and is operable in response to the pressure in the high pressure zone to reduce the opening degree of the high pressure communication passage when the pressure in the high pressure zone is lower than a predetermined value.

9 Claims, 4 Drawing Sheets

AIR CONDITIONING SYSTEM WITH VARIABLE CAPACITY COMPRESSOR

BACKGROUND OF THE INVENTION

This invention relates to an air conditioning system for automotive vehicles, and more particularly to a system of this kind which is provided with a variable capacity compressor in which the delivery quantity or capacity is varied by utilizing pressure in a high pressure zone.

Air conditioning systems are known, e.g. from Japanese Provisional Patent Publications (Kokai) Nos. 58-158382 and 62-129593, in which variable capacity compressors are employed, the delivery quantity or capacity of which is varied by utilizing a pressure in a high pressure zone in the compressor. Such air conditioning systems have the following disadvantages which are encountered when the pressure in the high pressure zone is low, that is, for example, when the ambient air temperature is extremely low, or when the compressor starts to operate when the ambient air temperature is extremely low.

According to the Japanese Provisional Patent Publication No. 58-158382, a capacity control means is provided, which selectively communicates the interior of a crankcase with a suction cavity or a discharge cavity in response to both suction pressure and discharge pressure so that when the difference between the suction pressure and the discharge pressure reaches a predetermined value, the difference between pressure within the the crankcase and the suction pressure becomes zero to obtain the maximum delivery quantity, while the delivery quantity is reduced as the difference between the suction pressure and the discharge pressure is increased to cause an increase in the difference between the pressure within the crankcase and the suction pressure, that is, the delivery quantity is reduced as the discharge pressure and suction pressure increase.

In this known compressor, when the discharge pressure is low, even if the capacity control means is operated to introduce the discharge pressure into the crankcase, the pressure within the crankcase is not increased to a sufficient level, which causes an insufficient increase in the difference between the pressure within the crankcase and the suction pressure, thereby failing to obtain a sufficient reduction in the delivery quantity of the compressor.

On the other hand, according to the Japanese Provisional Patent Publication No. 62-129593, the compressor comprises a control element which is circumferentially movable in response to the difference between pressure within a first chamber supplied with low or suction pressure and pressure within a second chamber supplied with high or discharge pressure, the circumferential position of which determines the compression commencing timing of the compressor, a communication passage communicating the second chamber with a low pressure side, and a control valve means arranged across the communication passage for closing same when the suction pressure is higher than a predetermined value, and opening same when the suction pressure is lower than the predetermined value, wherein the control element is circumferentially moved in response to a change in the pressure difference between the first and second chambers to vary the compression commencing timing and hence vary the delivery quantity. However, according to this known compressor, when the ambient air temperature is extremely low and accordingly the discharge pressure is low, even if the control valve means is operated at and immediately after the start of the compressor, the pressure within the first chamber does not increase to such a sufficient level as to enable proper control of the delivery quantity of the compressor.

SUMMARY OF THE INVENTION

It is the object of the invention to provide an air conditioning system, in which the delivery quantity of the compressor can be properly controlled, even when the ambient air temperature is extremely low, or at and immediately after the start of the compressor at a low ambient air temperature.

Throughout the present specification, the term "high pressure zone" means "discharge pressure chamber" or "discharge port in the discharge connector", and the term "low pressure zone" means "suction chamber" or "suction port in the suction connector".

According to the present invention, there is provided an air conditioning system including a refrigerating circuit, and a variable capacity compressor forming part of the refrigerating circuit, the compressor having a high pressure zone, and means for varing the delivery quantity thereof in dependence on pressure in the high pressure zone.

The present invention is characterized by the improvement comprising: a high pressure communication passage communicating the high pressure zone of the compressor with the refrigerating circuit; and a pressure control valve associated with the high pressure zone and the high pressure communication passage, the pressure control valve being operable in response to pressure in the high pressure zone to reduce the opening degree of the high pressure communication passage when the pressure in the high pressure zone is lower than a predetermined value.

The above and other objects, features and advantages of the invention will become more apparent upon reading of the following detailed description taken in conjunction with the accompanying drawings.

DETAILED DESCRIPTION

The invention will now be described in detail with reference to the drawings showing an embodiment thereof.

Figure 1:
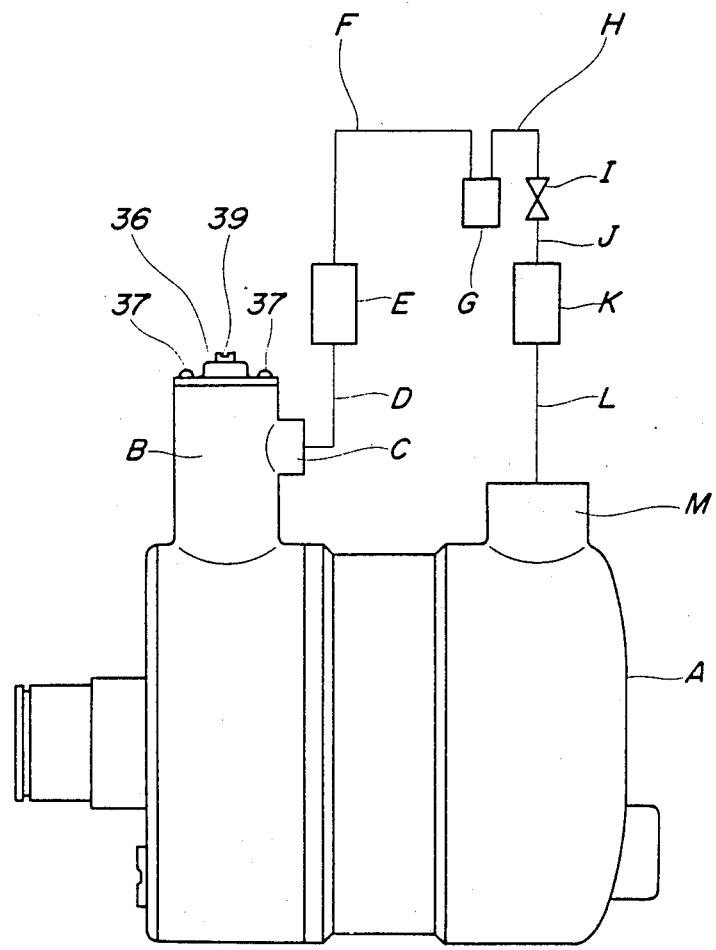
FIG. 1 is a block diagram of the entire arrangement of an air conditioning system according to a first embodiment of the invention.

Referring first to FIG. 1, there is shown the entire arrangement of an air conditioning system according to the invention, wherein reference symbol A designates a variable capacity vane compressor which has its delivery quantity varied by means of pressure in a higher pressure zone or discharge pressure, as hereinafter described with reference to FIG. 3. The compressor A has a discharge connector B with a discharge port 8 formed therein for discharging a compressed refrigerant gas as a thermal medium. The discharge connector B has an axially central portion thereof formed integrally with a piping connector C projected at right angles thereto for connecting the compressor to a high pressure line D. A refrigerating circuit is formed such that the piping connector C is connected to the inlet of a condenser E via the line D, the outlet of the condenser E to the inlet of a receiver tank G via a line F, the outlet of the receiver tank G to the inlet of an expansion valve I via a line H, the outlet of the expansion valve I to the inlet of an evaporator K via a line J, and the outlet of the evaporator K to a suction connector M of the compressor A via a line L, respectively.

Figure 2:
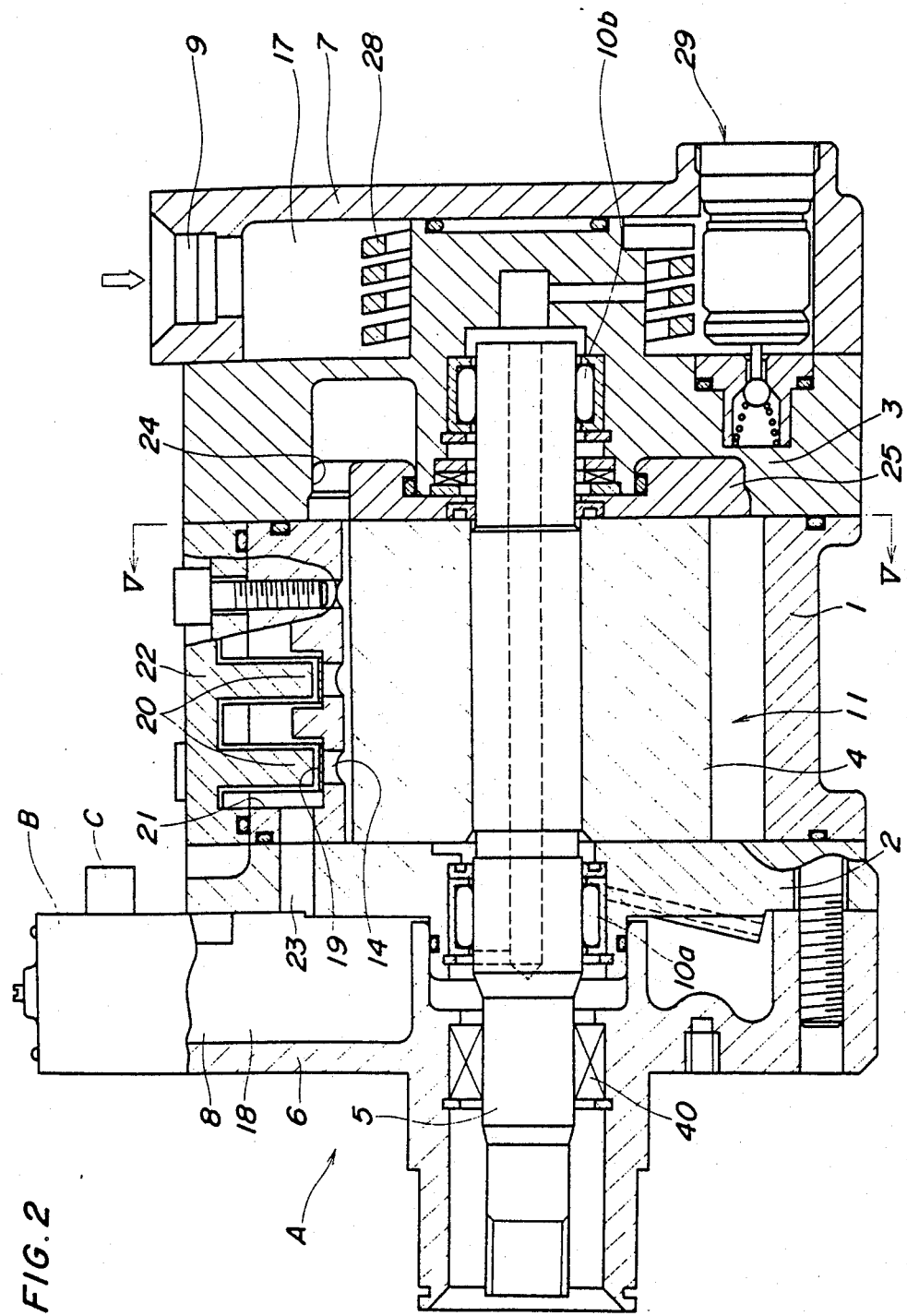
FIG. 2 is a longitudinal cross-sectional view of an example of a variable capacity vane compressor for use in the air conditioning system of FIG. 1.

FIG. 2 shows the interior of the compressor. The compressor has a pump body composed mainly of a cylinder formed by a cam ring 1, and a front side block 2 and a rear side block 3 closing open opposite ends of the cam ring 1, a cylindrical rotor 4 rotatably received within the cylinder, and a driving shaft 5 connected to an engine, not shown, of a vehicle or the like, and on which is secured the rotor 4.

A front head 6 and a rear head 7 are provided at opposite sides of the front and rear side blocks 2 and 3, respectively. The discharge connector B is integrally formed on an upper portion of the front head 6. The suction connector M is integrally formed on an upper portion of the rear head 7, and has a suction port 9 formed therein, through which the refrigerant gas is to be drawn into the compressor. The discharge port 8 and the suction port 9 communicate, respectively, with a discharge pressure chamber 18 and a suction chamber 17, both formed within the compressor, as hereinafter referred to. The discharge port 8 and the discharge pressure chamber 18 form the high pressure zone, and the suction port 9 and the suction chamber 17 form the low pressure zone.

The driving shaft 5 is rotatably supported by a pair of radial bearings 10a and 10b provided in the side blocks 2 and 3. The driving shaft 5 extends through the front side block 5 and the front head 6 while being sealed in an airtight manner against the interior of the compressor by means of a mechanical sealing device 29 provided around the shaft 5 in the front head 6.

Figure 3:
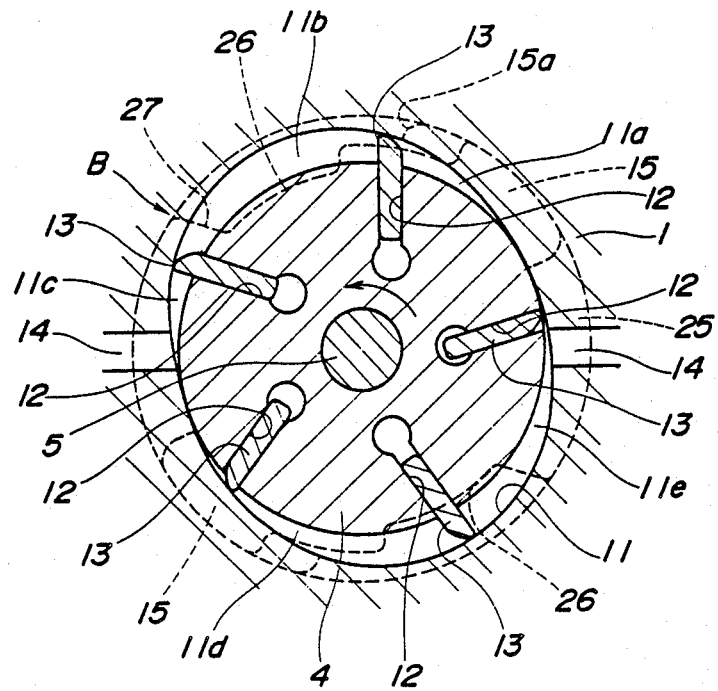
FIG. 3 is a transverse cross-sectional view of a rotor of the compressor of FIG. 2 at partial capacity operation.

The cam ring 1 has an inner peripheral surface with an oblong, e.g. elliptical cross section, as shown in FIG. 3, and cooperates with the rotor 4 to define therebetween a pair of spaces 11 at diametrically opposite locations.

The rotor 4 has its outer peripheral surface formed with a plurality of (five in the illustrated embodiment) axial vane slits 12 at circumferentially equal intervals, in each of which a vane 13 is radially slidably fitted. Adjacent vanes 13 define therebetween five compression chambers 11a–11e within the spaces 11 in cooperation with the cam ring 1, the rotor 4, and opposed inner end faces of the front and rear side blocks 2, 3. The axial vane slits 12 open in opposite end faces of the rotor 4.

The cam ring 1 has a pair of outlet ports 14, 14 formed through an inner peripheral wall thereof at diametrically opposite smallest-diameter portions thereof. A pair of inlet ports 15, 15 are formed in the inner end face of the rear side block 3 opposite to the cam ring 1 at diametrically opposite locations, each aligned with a portion of the cam ring 1 between the smallest-diameter portion and the largest-diameter portion thereof. The suction chamber (low pressure chamber) 17 is defined between the rear side block 3 and the rear head 7, which is communicated with the compression chambers 11a, 11d on the suction stroke, through the inlet ports 15, 15. The compression chambers 11c, 11e on the compression stroke are communicated with the discharge pressure chamber (high pressure chamber) 18, through the outlet ports 14, 14, a recess 21, and a communication port 23. The outlet ports 14, 14 are each provided with a discharge valve 19 and a stopper 20 for the discharge valve 19, as shown in FIG. 2. The stoppers 20 are formed integrally with a cover 22 fitted in the recess 21 formed in the cam ring 1 and having circumferential arcuate grooves. The recess 21 is communicated with the discharge pressure chamber 18 through the communication port 23.

The rear side block 3 has an end face facing the rotor 4, in which is formed an annular recess 24, as shown in FIG. 2. An annular control plate 25 as a control element is received in the annular recess 24 for rotation in opposite circumferential directions. The vanes 13 and the rotor 4 have respective end faces kept in slidable contact with an opposed or inner end face of the annular control plate 25 in an airtight manner. As shown in FIG. 3, the control plate 25 has its outer peripheral edge formed with a pair of diametrically opposite arcuate cut-out portions 26, 26, which each serve to communicate the compression chamber, which is to be on the compression stroke if the cut-out portions 26, 26 do not exist, with a lower pressure side, more specifically, with the corresponding inlet port 15 through the compression chamber on the suction stroke, so as to prevent the refrigerant gas from being compressed. In other words, compression is commenced immediately after the vane 13 has passed a downstream end of the cut-out portion 26. Thus, the compression commencing timing is varied with a change in the circumferential position of the cut-out portion 26, i.e. the control plate 25, thereby varying the capacity of the compressor. The control plate 25 is disposed to rotate about its own axis or the drive shaft 5 in opposite directions in response to the difference between pressure from a high pressure zone, e.g. the discharge pressure chamber 18, and the sum of pressure from a low pressure zone, e.g. the suction chamber 17, and the force of a coiled spring 28 circumferentially urging the control plate 25. The high pressure zone is communicated with the low pressure zone through a communication passage, not shown, which is opened and closed by means of a valve control device 29. Details of the valve control device are described in Japanese Provisional Patent Publication No. 62-129593, referred to hereinbefore.

Figure 4:
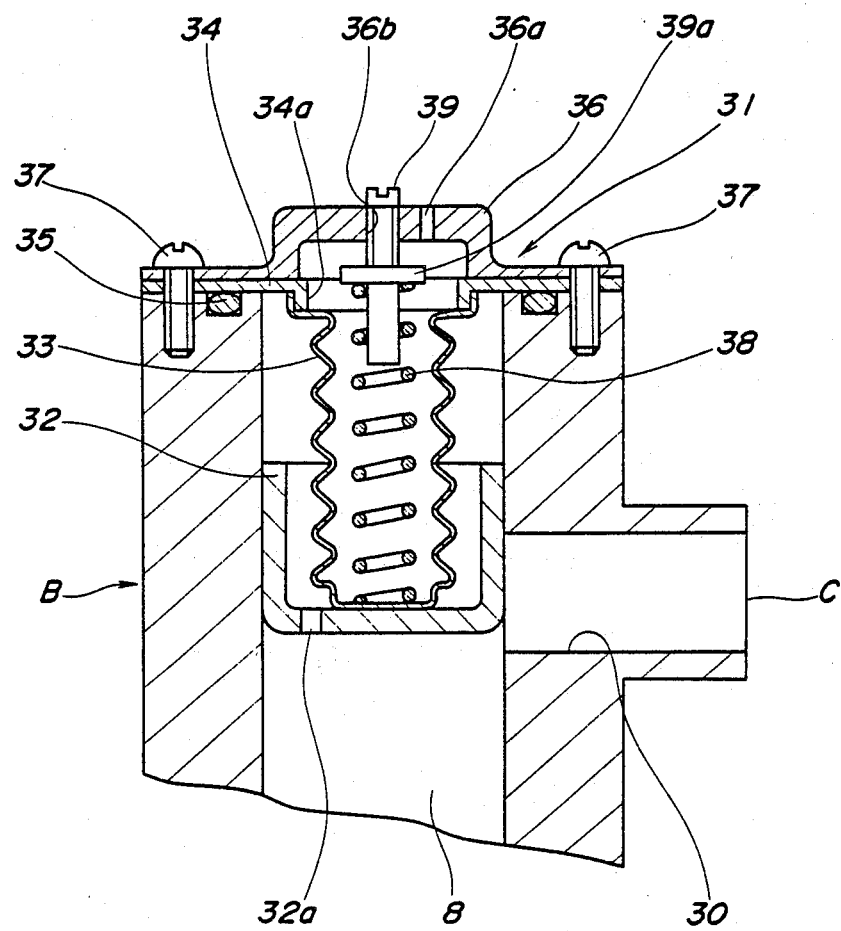
FIG. 4 is an enlarged cross-sectional view of a pressure control valve appearing in FIG. 1.

As best shown in FIG. 4, the piping connector C has a high pressure passage 30 formed therein. The passage 30 communicates with the discharge port 8 within the discharge connector B, with an end thereof opening into the discharge port 8. Provided in the interior of the discharge port 8 is a pressure control valve 31 for controlling the degree of opening or effective cross-sectional area of the high pressure passage 30. The pressure control valve 31 is a pressure-responsive valve. A valve body 32 having a U-shaped cross section is slidably fitted in the discharge port 8. A bellows 33 has an end face secured to a bottom end face of the valve body 32, and the other end secured in an air-tight manner to a boss integrally formed on a flange 34 along a peripheral edge of a central bore 34a therein. The flange 34 abuts an end face of the discharge port 8 via an O-ring 35, and is secured to same by means of screws 37, together with a cap 36 closing the open end of the discharge port 8. A coiled spring 38 is arranged in the bellows 33, with an end thereof disposed in urging contact with the bottom end of the valve body 32 via the bellows 33, and the other end with a spring seat 39a of an adjusting screw 39 screwed through a central hole 36b formed through the cap 36. A high pressure relief hole 32a and an air relief hole 36a are formed respectively through the bottom end face of the valve body 32 and the cap 36. The bollows 33 expands and contracts in response to the difference between high pressure introduced into the space defined by the bellows 33, the discharge port 8, and the valve body 32 through the high pressure relief hole 32a and the atmospheric pressure introduced into the interior of the bellows 33 through the air relief hole 36a. The valve body 32 is displaceable in response to the sum of the expanding or contracting force of the bellows 33 and the urging force of the spring 38 to thereby vary the opening degree of the high pressure passage 30.

The operation of the air conditioning system constructed as above will now be described.

With the operation of the variable capacity compressor A, refrigerant gas introduced through the suction port M into the compressor A is compressed to a high pressure, and the compressed gas is then circulated through the refrigerating circuit in the following order: the discharge port 8→ the high pressure passage 30→ the line D→ the condenser E→ the line F→ the receiver tank G→ the line H→ the expansion valve I→ the line J→ the evaporater K→ the line L→ the suction port M.

During the operation of the system described as above, the compressor operates to vary the delivery quantity thereof in the following manner:

When pressure within the suction chamber (lower pressure chamber) 17 exceeds a predetermined value, the control valve device 29 closes the aforementioned communication passage, whereby the pressure from the high pressure zone overcomes the sum of the pressure from the low pressure zone and the urging force of the coiled spring 28 to thereby make the control plate 25 move in such a circumferential direction as to the increase delivery quantity or capacity, that is, in the clockwise direction as viewed in FIG. 3. When the control plate 25 thus assumes the position shown in FIG. 5, the compression is commenced when the vane 13 passes a position A, where the downstream end 27 of the cut-out portion 26 is aligned with the downstream end 15a of the inlet port 15, resulting in the maximum delivery quantity (full capacity operation).

Figure 5:
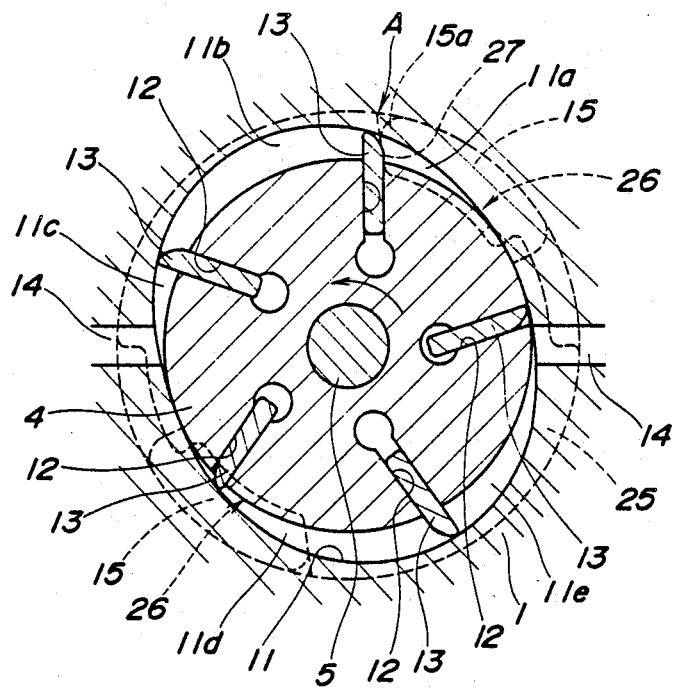
FIG. 5 is a view similar to FIG. 3, with the compressor being at full capacity operation.

On the other hand, when the pressure within the suction chamber 17 decreases below the predetermined value, the control valve device 29 opens the communication passage, whereby the pressure from the high pressure zone leaks through the open communication passage into the low pressure zone and consequently the pressure from the high pressure zone is decreased, thereby making the control plate 25 move in such a circumferential direction as to decrease the delivery quantity, that is, in the counter-clockwise direction in FIG. 5. When the control plate 25 thus assumes the position shown in FIG. 3, the compression is commenced when the vane 13 passes a position B or the downstream end 27 of the cut-out portion 26, resulting in the minimum delivery quantity (minimum capacity operation).

The operation of the pressure control valve 31 arranged within the discharge port 8 of the compressor A will next be described.

When the pressure of refrigerant gas within the discharge port 8, i.e. discharge pressure is higher than a predetermined value, the bellows 33 contracts so that the valve body 32 is displaced upward as viewed in FIG. 4, thereby increasing the opening degree of the high pressure passage 30.

On the other hand, when the discharge pressure within the discharge port 8 is higher than the predetermined value, the bellows 33 expands so that the valve body 32 is displaced downward as viewed in FIG. 4, thereby decreasing the opening degree of the high pressure passage 30.

Since in this manner the valve body 32 controls the opening degree of the high pressure passage 30, that is, the effective opening degree of the discharge port 8 so as to maintain the discharge pressure within the discharge port 8 at a value higher than a predetermined value, the discharge pressure within the discharge port 8 does not drop even if the ambient air temperature is low. Furthere, since the valve body 32 holds the high pressure passage 30 almost closed at and immediately after the start of operation of the system when the ambient air temperature is low, the discharge pressure within the discharge port 8 rapidly increases to a level enough to enable controlling the capacity of the compressor A, so that the compressor A can be properly controlled immediately after the start.

Although, in the above described embodiment, the pressure control valve 31 is arranged within the compressor A, the invention is not limited thereto, but the pressure control valve 31 may be arranged, for example, across the line D connecting the piping connector C and the condenser E.

Further, although a variable capacity vane compressor is employed in the above embodiment, the invention is applicable to a variable capacity wobble plate compressor as disclosed by Japanese Provisional Patent Publication No. 58-158382, referred to hereinbefore, a variable capacity swash-plate compressor, or other types of compressors, insofar as pressure in a high pressure zone of the compressor is utilized for control of the capacity.

Also, the pressure control valve 31 is not limited to the type employed in the above described embodiment using bellows, but may be another type using e.g. a diaphragm to be displaced in response to pressure in a high pressure zone.

What is claimed is:

1. In an air conditioning system including a refrigerating circuit, and a variable capacity compressor forming part of said refrigerating circuit, said compressor having means for defining a high pressure zone into which discharge pressure is supplied, means for defining a low pressure zone in which suction pressure is created, and means for varying the delivery quantity thereof in dependence on a difference between the discharge pressure in said high pressure zone and the suction pressure in said low pressure zone, the improvement comprising:

a high pressure communication passage communicating said high pressure zone of said compressor with said refrigerating circuit; and a pressure control valve associated with said high pressure zone of said compressor and said high pressure communication passage, said pressure control valve being operable in response to the discharge pressure in said high pressure zone of said compressor to reduce the opening degree of said high pressure communication passage when the discharge pressure in said high pressure zone is lower than a predetermined value, said predetermined value being set such that said means for varying the delivery quantity effects predetermined capacity control in dependence on the difference between the discharge pressure in said high pressure zone and the suction pressure in said low pressure zone when the discharge pressure in said high pressure zone exceeds said predetermined value.

2. An air conditioning system as claimed in claim 1 wherein said compressor includes a low pressure zone, a cylinder having at least one inlet port, a rotor rotatably received within said cylinder, a plurality of vanes carried by said rotor, said cylinder, said rotor, and adjacent ones of said vanes cooperating to define at least one compression chamber, a control element angularly movably arranged within said cylinder in slidable contact with one end face of said rotor, the angular position of said control element determining compression commencing timing of a refrigerant gas drawn into said at least one compression chamber through said at least one inlet port, said control element being angularly displaceable substantially in response to the difference between the pressure from said high pressure zone and pressure from said low pressure zone, and control means for varying at least one of the pressure from said high pressure zone and the pressure from said low pressure zone to thereby angularly displace said control element.

3. An air conditioning system as claimed in claim 2, wherein:
said low pressure zone of said compressor comprises a suction chamber therein; and
said control means displacing said control element and changing the angular position of said control element in such a direction as to retard the compression commencing timing of the refrigerant gas, in response to a reduction in pressure within said suction chamber.

4. An air conditioning system as claimed in claim 1, wherein said high pressure zone of said compressor comprises a discharge port of said compressor.

5. An air conditioning system as claimed in claim 4, wherein said compressor includes a low pressure zone, a cylinder having at least one inlet port, a rotor rotatably received within said cylinder, a plurality of vanes carried by said rotor, said cylinder, said rotor, and adjacent ones of said vanes cooperating to define at least one compression chamber, a control element angularly movably arranged within said cylinder in slidable contact with one end face of said rotor, the angular position of said control element determining compression commencing timing of a refrigerant gas drawn into said at least one compression chamber through said at least one inlet port, said control element being angularly displaceable substantially in response to the difference between the pressure from said high pressure zone and pressure from said low pressure zone, and control means for varying at least one of the pressure from said high pressure zone and the pressure from said low pressure zone to thereby angularly displace said control element.

6. An air conditioning system as claimed in claim 5, wherein:
said low pressure zone of said compressor comprises a suction chamber therein; and
said control means displacing said control element and changing the angular position of said control element in such a direction as to retard the compression commencing timing of the refrigerant gas, in response to a reduction in pressure within said suction chamber.

7. An air conditioning system as claimed in claim 4, wherein:
said high pressure communication passage has an end opening into said discharge port; and
said pressure control valve comprises a valve body slidably fitted in said discharge port for varying the opening degree of said high pressure communication passage, and a bellows arranged within said discharge port for displacing said valve body in response to pressure within said discharge port.

8. An air conditioning system as claimed in claim 7, wherein said compressor includes a low pressure zone, a cylinder having at least one inlet port, a rotor rotatably received within said cylinder, a plurality of vanes carried by said rotor, said cylinder, said rotor, and adjacent ones of said vanes cooperating to define at least one compression chamber, a control element angularly movably arranged within said cylinder in slidable contact with one end face of said rotor, the angular position of said control element determining compression commencing timing of a refrigerant gas drawn into said at least one compression chamber through said at least one inlet port, said control element being angularly displaceable substantially in response to the difference between the pressure from said high pressure zone and pressure from said low pressure zone, and control means for varying at least one of the pressure from said high pressure zone and the pressure from said low pressure zone to thereby angularly displace said control element.

9. An air conditioning system as claimed in claim 8, wherein:
said low pressure zone of said compressor comprises a suction chamber therein; and
said control means displacing said control element and changing the angular position of said control element in such a direction as to retard the compression commencing timing of the refrigerant gas, in response to a reduction in pressure within said suction chamber.

* * * * *